(12) United States Patent
Franssen et al.

(10) Patent No.: US 11,365,944 B2
(45) Date of Patent: Jun. 21, 2022

(54) MACHINE GUN

(71) Applicant: FN Herstal S.A., Herstal (BE)

(72) Inventors: Pascal Marcel Henri Denis Franssen, Saint-Rémy (BE); Damien Nicole Freddy Verhaegen, Thimister (BE); Robert Beckers, Soumagne (BE); Paul Michotte, Trooz (BE); Antoine Godbille, Liège (BE)

(73) Assignee: FN Herstal S.A., Herstal (BE)

( * ) Notice: Subject to any disclaimer, the term of this patent is extended or adjusted under 35 U.S.C. 154(b) by 0 days.

(21) Appl. No.: 16/646,518

(22) PCT Filed: Sep. 10, 2018

(86) PCT No.: PCT/EP2018/074288
§ 371 (c)(1),
(2) Date: Mar. 11, 2020

(87) PCT Pub. No.: WO2019/048672
PCT Pub. Date: Mar. 14, 2019

(65) Prior Publication Data
US 2020/0271404 A1 Aug. 27, 2020

(30) Foreign Application Priority Data

Sep. 11, 2017 (EP) ..................................... 17190388
Oct. 26, 2017 (EP) ..................................... 17198580

(51) Int. Cl.
| | | |
|---|---|---|
| F41A 9/55 | (2006.01) | |
| F41A 9/29 | (2006.01) | |
| F41A 3/66 | (2006.01) | |
| F41A 9/32 | (2006.01) | |
| F42B 39/08 | (2006.01) | |
| F41A 9/30 | (2006.01) | |

(Continued)

(52) U.S. Cl.
CPC .................. *F41A 3/66* (2013.01); *F41A 9/29* (2013.01); *F41A 9/30* (2013.01); *F41A 9/32* (2013.01); *F41A 9/34* (2013.01); *F42B 39/08* (2013.01); *B33Y 80/00* (2014.12)

(58) Field of Classification Search
CPC ...... F41A 3/66; F41A 9/00; F41A 9/29; F41A 9/30; F41A 9/31; F41A 9/32; F41A 9/33; F41A 9/34; F41A 9/54; F41A 9/55; F41A 9/56; F41A 9/58
See application file for complete search history.

(56) References Cited

U.S. PATENT DOCUMENTS 1,123,530 A * 1/1915 Heinemann ............... F41A 9/32
  89/33.2
1,719,126 A * 7/1929 Pfeiffer ..................... F41A 9/34
  89/33.14

(Continued)

FOREIGN PATENT DOCUMENTS

| | | |
|---|---|---|
| DE | 202011100438 U1 | 7/2011 |
| FR | 2356113 A1 | 1/1978 |

OTHER PUBLICATIONS

Search Report in PCT/EP2018/074288, dated Nov. 14, 2018.

*Primary Examiner* — Derrick R Morgan
(74) *Attorney, Agent, or Firm* — Leydig, Voit & Mayer, LTD

(57) ABSTRACT

The present invention relates to a machine gun (1) comprising a carcass body (22) with an essentially tubular shape.

13 Claims, 13 Drawing Sheets

(51) Int. Cl.
*F41A 9/34* (2006.01)
*B33Y 80/00* (2015.01)

(56) References Cited

U.S. PATENT DOCUMENTS

| | | | | | |
|---|---|---|---|---|---|
| 2,383,780 | A | * | 8/1945 | Dobremysl | F41A 9/32 89/33.2 |
| 2,444,936 | A | * | 7/1948 | MacFarlane | F41A 9/54 89/33.2 |
| 2,466,893 | A | * | 4/1949 | Holton | F41A 9/54 89/33.4 |
| 2,476,552 | A | * | 7/1949 | Katz | F41A 9/58 89/33.2 |
| 2,550,837 | A | * | 5/1951 | MacKenzie | F41A 9/54 89/33.5 |
| 2,589,250 | A | * | 3/1952 | Heenan | F41A 9/58 89/33.2 |
| 2,655,837 | A | * | 10/1953 | Johnson | F41A 9/29 89/33.2 |
| 2,750,845 | A | * | 6/1956 | Maillard | F41A 9/33 89/33.25 |
| 2,829,562 | A | * | 4/1958 | La Rue | F41A 9/54 89/33.14 |
| 3,076,386 | A | * | 2/1963 | Wey | F41A 9/37 89/33.14 |
| 3,230,828 | A | * | 1/1966 | Maillard | F41A 9/49 89/33.25 |
| 3,311,021 | A | * | 3/1967 | Reed | F41A 9/47 89/33.25 |
| 3,386,336 | A | * | 6/1968 | Roy | F41A 9/32 89/128 |
| 3,421,408 | A | * | 1/1969 | Badali | F41A 9/55 89/33.1 |
| 3,894,471 | A | * | 7/1975 | Jayne | F41H 7/03 89/33.01 |
| 3,901,123 | A | * | 8/1975 | Jayne | F41A 15/00 89/33.2 |
| 4,112,817 | A | * | 9/1978 | Bourlet | F41A 9/54 89/33.1 |
| 4,587,879 | A | * | 5/1986 | Savioli | F41A 9/55 89/33.04 |
| 5,383,389 | A | * | 1/1995 | Wolff | F41A 9/30 89/137 |
| 5,782,157 | A | * | 7/1998 | Ellington | F41A 9/29 193/25 AC |
| 5,886,280 | A | * | 3/1999 | Collins | F41A 33/00 89/29 |
| 5,900,577 | A | * | 5/1999 | Robinson | F41A 11/02 89/191.01 |
| 9,618,284 | B1 | * | 4/2017 | Hoffman | F41A 3/66 |
| 10,746,493 | B1 | * | 8/2020 | Steimke | F41A 3/68 |
| 2004/0060428 | A1 | * | 4/2004 | Sanderson | B64D 7/06 89/37.22 |
| 2008/0216375 | A1 | * | 9/2008 | Barrett | F41A 3/66 42/16 |
| 2013/0047833 | A1 | * | 2/2013 | Steimke | F41A 9/29 89/191.01 |
| 2016/0195350 | A1 | * | 7/2016 | Packard | F41A 9/55 42/6 |
| 2017/0023320 | A1 | * | 1/2017 | Barrett | F41A 9/29 |
| 2017/0268840 | A1 | * | 9/2017 | Rowe | F41F 1/10 |
| 2017/0328668 | A1 | * | 11/2017 | Lowrance | F41A 9/34 |
| 2018/0058816 | A1 | * | 3/2018 | Geissele | F41G 11/003 |
| 2019/0339032 | A1 | * | 11/2019 | Barrett | F41A 3/66 |

\* cited by examiner

MACHINE GUN

SUBJECT OF THE INVENTION

The present invention relates to a machine gun, to the feed system and to the frame of such a machine gun.

STATE OF THE ART

The ergonomics of a weapon is a fairly particular notion in as much as it brings together a certain number of criteria ranging from the weight and the bulk of a weapon to its manipulation in firing and handling conditions. It is generally accepted that a weapon provided with better ergonomics is a weapon which allows its user to better fulfil his or her role within his or her unit. An improvement in the ergonomics of the weapon can be reflected in different ways in the field. It can culminate in increased mobility of the user, enhanced availability of the weapon in the field, ease of use of the weapon, etc.

A machine gun is understood to be a firearm capable of pulling an ammunition belt, unlike the firearms that are fed from a magazine (rifle or pistol). The ammunition belt is composed of a series of cartridges linked to one another by links, said links being detached from one another when the cartridges are extracted therefrom.

The frame of a machine gun is the central part of the weapon, which serves both as main structural element, but also as reference base for the positioning of all the added-on or assembled parts which perform the cycle of operation of the weapon.

In most machine guns, the functions associated with belt feed are present in the upper part of the weapon. The ammunition belt being placed manually on a feed channel before being held by different elements in the feed cover. The main advantage of this configuration is that it facilitates the operations of reloading and of resolving malfunctions through the horizontal positioning of the feed channel and through the good accessibility, both visual and to the touch, of the elements performing the feed functions.

One drawback with this architecture is that, with the aiming systems being placed on top of the barrel, it is necessary to incorporate them partially (peep sight and front sight mechanical aiming members) or completely (modular aiming members mounted via a standard Picatinny rail) on the feed cover of the weapon. The result thereof is a certain inaccuracy of the alignment of the aiming point and of the point of impact of the projectiles because of the uncertainty as to the repositioning of the feed cover each time the latter is opened and closed.

Another drawback is that it is impossible to use certain optical members (long scope with great enlargement, light intensifier, night vision, etc.) because of the additional bulk of the main aiming optic when the feed cover is in open position. Indeed, for the machine guns with top feed with long cover, the sighting scopes are directly mounted on the cover which means that, on opening the latter, the sighting scope is itself also tilted which requires the devices of light intensifier type to be shifted forward. Since the latter are no longer mounted directly in front of the sighting scope but further away forward with a gap between the two optics favorable to pollution, both optical (reflections from a light source) and physical (pollution by sand, mud, etc.).

After a large number of ammunition items have been fired within a limited time, the barrel heats up greatly. Another drawback with the mounting of the optic on the long covers is that, when the cover is held open, the optic is oriented toward the barrel. In this case, the heat from the barrel is transmitted to the optic which can substantially degrade it, the latter not being designed to withstand such high temperatures. To avoid that, it is necessary to place a heat shield between the barrel and the optic which makes the machine gun heavier.

On some machine guns (such as the Negev IMI machine gun), the choice was made to limit the length of the feed cover to the maximum. That makes it possible to reduce the abovementioned drawbacks by mounting the optics on the rear of the frame, but that greatly constrains the length of the optics that are compatible with the weapon. Indeed, in this case, it is necessary for the optic not to pass above the feed cover to allow the latter to be open. This limitation applies also to the alignment of multiple optical members (light intensifier in front of a conventional aiming member, etc.), the member in front must, in this case, either be mounted on the cover (which leads to the abovementioned drawbacks regarding the limitations of the aiming members mounted directly on the feed cover), or be mounted in front of the feed cover which separates it considerably from the two optical devices.

To circumvent these problems, some weapons have offered alternative architectures by positioning the feed functions either in the bottom part of the weapon (such as the HK 21 and HK 23, XM 248 machine guns), or on the side of the weapon with a vertical feed channel (United States 7.92 mm light machine gun t44, M60 with lateral feed). These two present alternatives major drawbacks with respect to the belt changing operations and the resolving of malfunctions. When the feed takes place from the bottom, the accessibility of the belt advancing elements and the chamber is very limited which complicates the empty chamber checking operations, and the resolving of problems linked to the feed or extraction.

When the feed is lateral with a vertical feed channel, the problems encountered relate mainly to the placement of a new ammunition belt. Indeed, the latter will often have a tendency to move or even fall before the operator has had time to close the cover of the weapon. These different drawbacks are highly detrimental because the operations of reloading or of resolving malfunctions are likely to occur at the worst moment (in full engagement, under adverse fire) and are reflected in a loss of firing power over a more or less lengthy time.

Usually, the frame of a machine gun is produced by the assembly of intermediate components. The aim is to be able to accurately perform the finishing machining of the different parts before assembling the latter. The various components have an "open" form which allows access for cutting tools (for milling or turning). For the machine guns, this opening is generally formed in the upper part of the frame because the latter will be covered by the feed cover which is removable to allow a new belt to be put in place.

In the context of a machine gun, this type of assembly requires the use of steel. Indeed, to retain a sufficient stiffness and avoid weakened zones at the points of assembly, a material with a Young's modulus and a sufficient yield strength are often required. That is amplified by the fact that a machine gun must maintain a greater volume of fire than the other weapons which implies an increasing of the temperature of the weapon and therefore a degradation of the performance of the materials. For reasons both historical and economic, the material preferred for this application has always been steel. The main consequence of the choice of steel for the frame of the machine gun is a significant increase in the weight of the weapon. Because of this, the machine guns are generally heavier than the other shoulder weapons used by infantry units which significantly penalizes the mobility of all of the unit.

Moreover, for a machine gun, the ejection of the links is generally performed by the dynamics of the belt in motion: when the belt is pushed by its advancing mechanism, the link freed of its cartridge is directed towards its window of ejection out of the frame. In particular, once the last cartridge has been fed, there remain two links to be ejected. No mechanism is provided for this particular case of the last cartridge.

The main risk with this mode of operation is allowing a link to enter into the frame via the opening of the feed channel which allows the passage of the bolt and of the cartridge. If a link enters into the frame, it will cause a malfunction by blocking the movement and the mechanism of the parts included inside the weapon. This risk is increased if the feed channel of the machine gun is inclined relative to the horizontal: gravity can then direct the link toward the opening of the feed channel.

A second problem is that the last link generally remains on the feed channel, the soldier must usually "clean" the latter before positioning a new belt, and there is therefore an associated loss of time.

Finally, in the machine guns of the prior art, there is nothing to perfectly hold (according to 6 degrees of freedom) the belt on the feed channel when the cover is open. The reloading of a machine gun is often performed with a hand on the handle, the free second hand having to open the cover then position the belt thereon, before releasing it to reclose the cover. This loading operation is often performed under stress since it is done in a vulnerable position without ammunition in position ready to fire. If, during this operation, the machine gun is moved, its feed channel inclined, there is a risk that the band may not be positioned correctly once the cover is closed. The loading operation will then be followed by a malfunction (shot not started).

To sum up, the conventional machine guns present the following main drawbacks:
- The mobile cover disposed on the top of the weapon prevents the reliable positioning of fixed accessories such as a sighting scope;
- At the end of a belt, one or more links generally remain in the channel, and, the firer must generally discharge these links before being able to reload;
- The poor discharging of a link can lead to a malfunction by blocking the reloading mechanism;
- The positioning of the belt, and in particular the positioning of the last cartridge is imprecise and can thus lead to malfunctions;
- Since the belt is not held, the user must hold it until the cover is closed, which demands the use of both hands.

SUMMARY OF THE INVENTION

A first aspect of the invention relates to a machine gun comprising a feed channel for an ammunition belt and a cover for the feed channel the closing movement of which induces an adjustment of the longitudinal position of the ammunition belt in the feed channel.

Advantageously, the adjustment of the longitudinal position of the belt in the channel is obtained via an element that makes it possible to push the belt in the feed channel during the closure movement of the cover, and that allows the passage of the belt during subsequent firing cycles (non-return ratchet).

Preferably, the non-return ratchet is incorporated in the cover, and the closure movement of said cover comprises a component parallel to said feed channel, so as to allow an accurate adjustment of the first ammunition item.

Advantageously, the parallel component of the closure movement of the cover is obtained by an axis of rotation of the cover that is secant relative to the plane of the feed channel.

Advantageously, the feed channel and its cover are disposed laterally, inclined relative to the vertical, the axis of opening of the cover being essentially vertical.

Preferably, the machine gun according to the invention comprises, on its top face, a fixed accessory assembly interface, this interface being able preferably to comprise a rail of Picatinny type.

Alternatively, a system of connecting rods actuating the non-return ratchet is incorporated in the frame or in the cover to push the belt to its loading position when the cover is closed. In this case, the connecting rod or rods actuating the ratchet can for example be moved by a button or a lever extending from the frame or from the cover that is actuated by the closure.

In another alternative, an inclined surface protruding on the inner face of the cover or of the frame actuates a mobile part on the complementary inner face, said mobile part having a movement parallel to the movement of the belt and making it possible to adjust the position thereof.

A second aspect of the invention relates to a feed mechanism for a firearm fed by an ammunition belt comprising a mechanism for ejecting the last two links of said belt.

Advantageously, this mechanism comprises a mobile ratchet pushing on the penultimate link and actuated by the mobile parts of the machine gun.

Preferably, the mobile ratchet for ejecting the last two links is secured to the belt traction mechanism.

Advantageously, the belt traction mechanism comprises a mobile ratchet pushing, in use, against an ammunition item, said ratchet pushing against the ammunition item and the ratchet for ejecting the last two links being actuated by one and the same lever actuated by the movement of the mobile parts of the machine gun.

The ratchet for ejecting the last two links and the advancing ratchet can be produced in a single part, or separately. Preferably, they are two parts rotating about one and the same axis and secured via an elastic part such as a spring or a spring blade.

Alternatively, the belt traction mechanism comprises a star that meshes, in use, on the cartridges and the mechanism for ejecting the last two links comprises a second star that meshes, in use, on the links. Preferably, the two stars turn about one and the same axis. Advantageously, the link between the two stars is ensured by an element that can be deformed elastically such as a torsion spring or a pin made of elastic material (elastomer) passing through the advancing star of the belt and the ejecting star.

Alternatively, or in combination with the ratchet or the star for ejecting the last two links, the means for ejecting the last two links comprise a flexible claw mounted on a spring and pushing on the last link to eject it.

Preferably, the flexible claw is mounted on a spring, whose energy is used to eject the last link.

Advantageously, the portion of the flexible claw used to eject the link enters into contact with a link only when this link is not linked to an ammunition item. For this, for example, the claw is retained in an intermediate position, when an ammunition item is present, by the non-return ratchet which occupies an extreme position when it is no longer pressing on an ammunition item (i.e. at the end of the belt).

Preferably, the flexible claw is linked elastically to flaps for holding the links and the ammunition item in the feed channel.

Advantageously, the flexible claw is linked to an indicator of presence of an ammunition item in position in the feed channel.

A third aspect of the invention relates to a machine gun comprising a feed channel comprising a main slip surface for an ammunition belt, lateral faces guiding, in use, the ammunition belt, and one or more holding surfaces for the belt positioned at the top edge of the lateral faces, said holding surfaces facing the slip surface and said holding surfaces being open, so as to allow the introduction of the ammunition belt.

Advantageously, at least one of the holding surface or surfaces is retractable, leaving free at least one top edge of the lateral faces, so as to facilitate the positioning of an ammunition belt.

Alternatively, the holding surface or surfaces are narrow and elastic, allowing an introduction "by force" of the belt.

Preferably, the holding surface or surfaces of the belt belong to runners along top edges of the lateral faces of the feed channel, at least one of these runners being retractable.

Advantageously, the retractable runner or runners are held along lateral faces of the feed channel by elastic means.

Preferably, the retractable runner or runners have an inclined top surface allowing the ammunition belt to be put in place by simply pressing the latter against the inclined surface of the runner.

Advantageously, the retractable runner or runners have a chamfer in the portion corresponding to the entry of the belt into the feed channel allowing an ammunition belt to be removed by twisting the belt.

A fourth aspect of the invention relates to a firearm comprising a frame body having an essentially tubular geometry.

Essentially tubular geometry is understood to mean a hollow part, formed in a single piece, comprising a minimum of lateral orifices (entry of the feed channel, screw fixing drill-holes, etc.), and therefore comprising an essentially closed lateral surface.

Advantageously, the firearm comprises a feed channel and a cover disposed laterally, inclined toward the outside relative to the vertical, the axis of opening of the cover being essentially vertical.

Preferably, the firearm according to the invention comprises, on its top face, a fixed accessory assembly interface, this interface being preferably able to comprise a rail of Picatinny type.

It should be noted that all these aspects of the invention are compatible with one another and all contribute to obtaining an ease of placement of the belt in the feed channel, by emptying the latter when the last ammunition item is fired, by holding the belt in the channel when the cover is open, by correctly positioning the belt when the cover is closed and by placing the feed laterally.

DETAILED DESCRIPTION OF THE INVENTION

The present description essentially describes an example of a weapon implementing all the aspects of the present invention. A person skilled in the art will easily understand that the different aspects of the invention, although they can be used separately, have synergies which emerge clearly in light of this example and of the few variants described.

In the present description, the "last ammunition item" will designate the one which is at the end of the belt, either in position, or ready to be fed. The links will of course be named in the same way.

The term longitudinal, when it relates to a feed channel, or to the movement of an ammunition belt relates to the direction of belt feed displacement, the barrel therefore being in the transverse direction relative to the longitudinal weapon feed direction.

Figure 1:
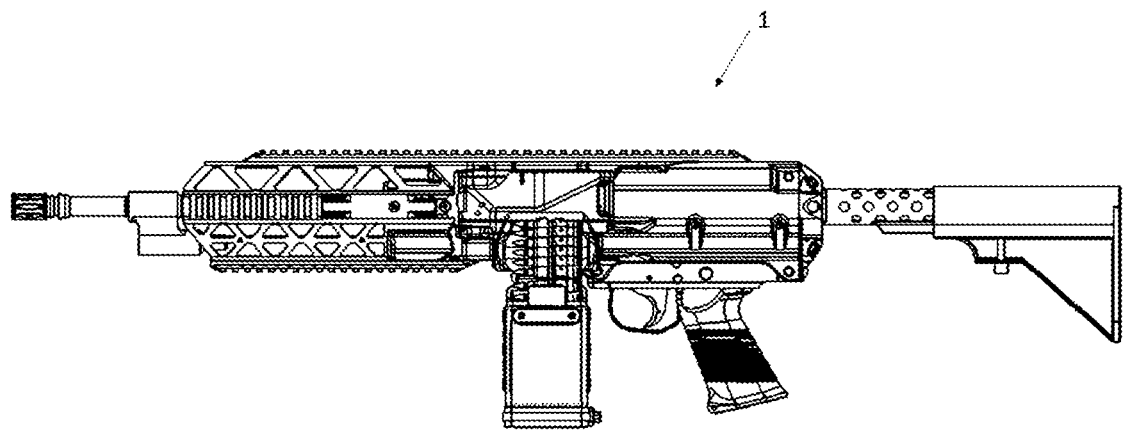
FIG. 1 represents a side view of a machine gun according to the invention.

FIG. 1 represents an example of machine gun according to the invention. This machine gun has a lateral feed allowing the use of a rail of Picatinny type 21, that is continuous and fixed onto the top of the frame body 22. On top is understood to mean the top part when the weapon is used in a conventional position. Obviously, other types of accessory fixing interfaces could be used.

Figure 2:
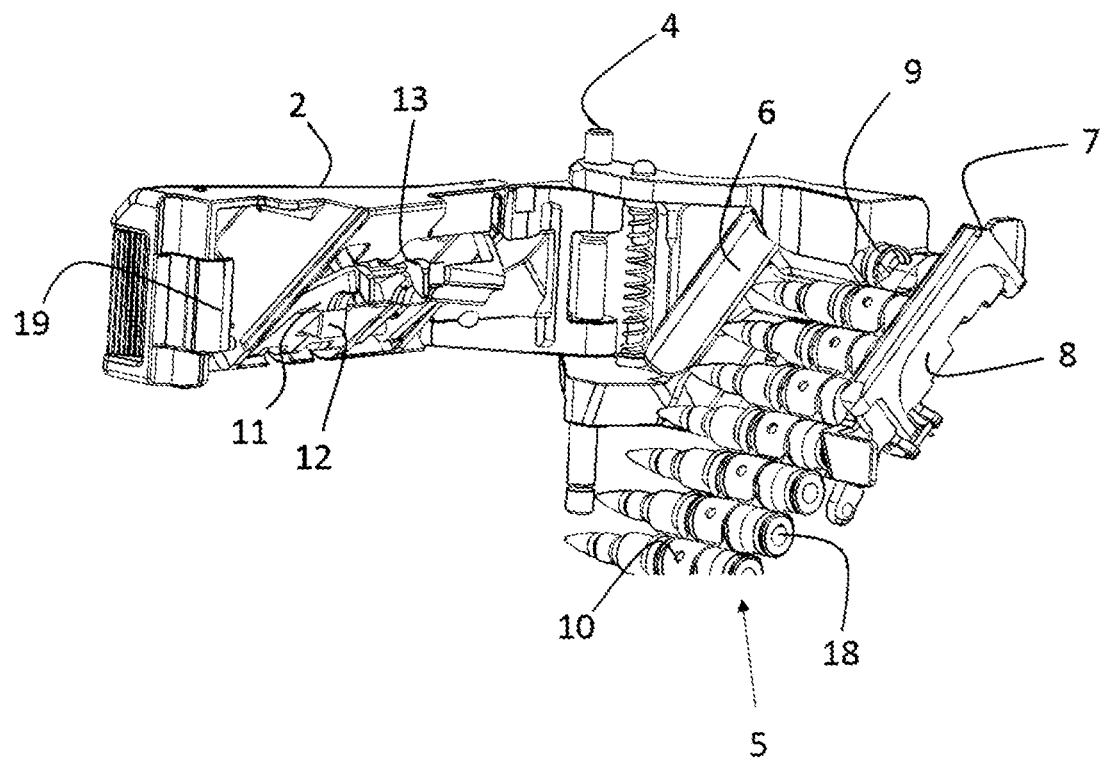
FIG. 2 represents a perspective view of an example of feed channel according to the invention, with the cover open and an ammunition belt in place.

FIG. 2 represents a perspective view of the feed channel with an ammunition belt 5 positioned, and the cover 2 open. This cover comprises closure means 19 cooperating with corresponding means of the frame 22.

Figure 3:
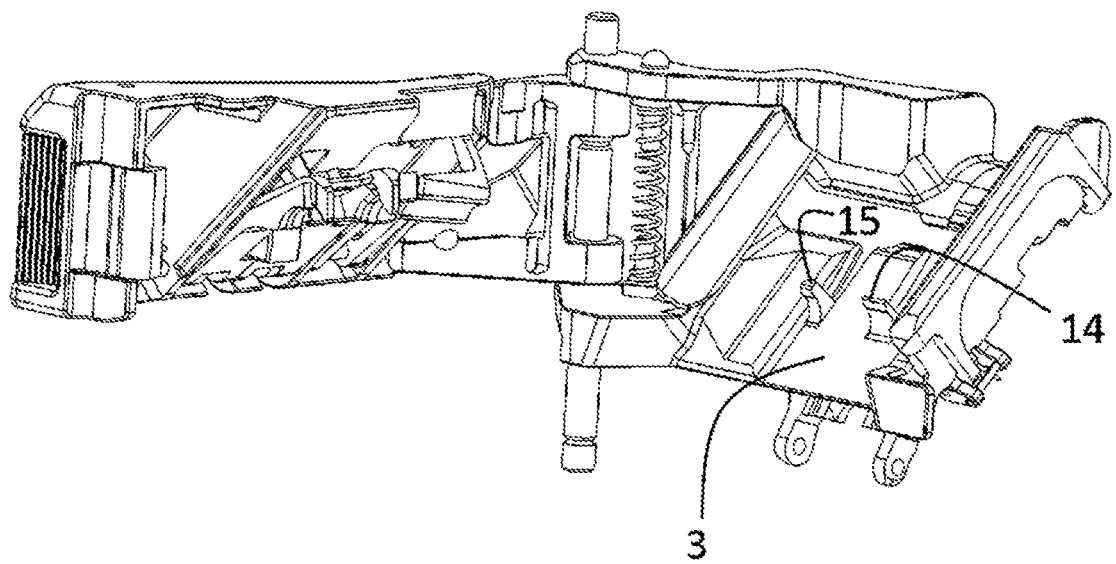
FIG. 3 represents a perspective view of an example of feed channel according to the invention, with the cover open and without ammunition belt.

FIG. 3 represents the same channel, without ammunition belt 5, which makes it possible to distinguish the ratchets 15 and 14, pushing respectively on the anterior part of the penultimate ammunition item, and on the central part 10 of the penultimate link. These ratchets 14, 15 protrude from the slip surface 3 for the ammunition belt 5. As will be seen later, the central position of the ratchet 14 makes it possible to eject the last link.

It can also be seen in these figures that the slip surface 3 of the feed channel, and the corresponding surface of the cover 2 are inclined at 45°, whereas the common axis 4 of these two assemblies is vertical. This secant deposition of the axis of rotation of the cover relative to the ammunition slip plane allows the cover to have a component of movement, during closure, that is parallel to the slip movement of the ammunition items 18.

This horizontal component allows a non-return ratchet 12 to push on the penultimate ammunition item (or rather, here, on the central part of the penultimate link). This positioning movement is better illustrated in the cross sections of FIGS. 4 and 5.

Figure 4:
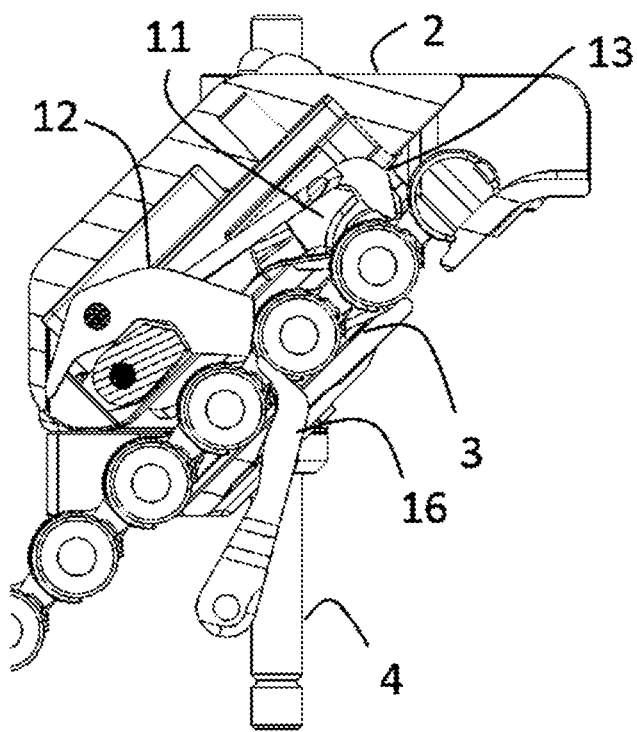
FIG. 4 represents a cross-sectional view of a device according to the invention, the cover being partially closed.

In FIG. 4, the cover is not yet closed, and the belt rests on the belt advancing ratchets 16, 15. These ratchets 15, 16, free to rotate about their axis, do not allow an accurate positioning of the belt 5. In particular, FIG. 4 shows an excessively low positioning of the last ammunition item (i.e. the ammunition item is not "in position", positioned in the middle of the opening of the feed channel). Finally, the position of the advancing ratchets depends on the position of the bolt 17 and of the mobile parts, which is not unequivocal in the placement of the belt, particularly in the case of a weapon operating with breech open: the bolt 17 can be in forward position, chamber empty and locked, or the bolt 17 is in rear position, chamber empty. Depending on the case (and depending on the belt drive mechanisms) the advancing ratchets 14, 15, 16 will be in different positions.

Figure 5:
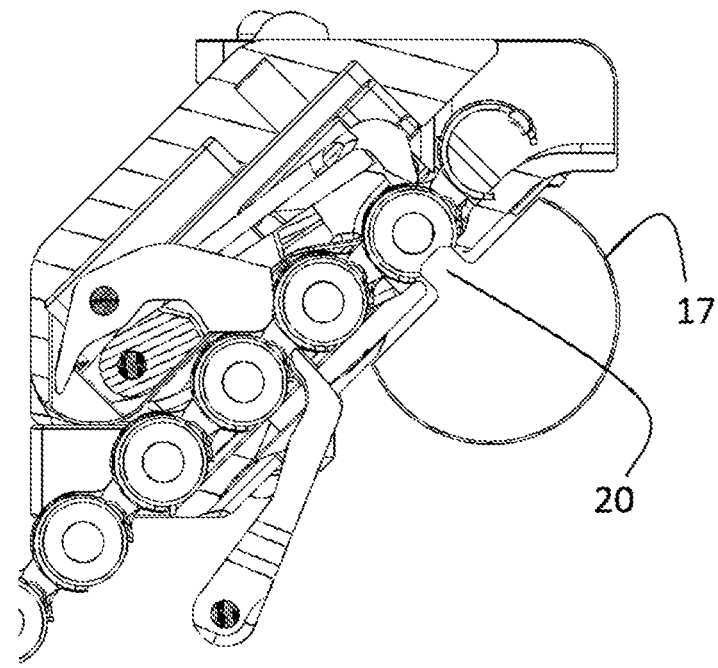
FIG. 5 represents a cross-sectional view of the device of FIG. 4, with the cover closed.

It can be seen in FIG. 5, after the closure of the cover, that the pressure of the non-return ratchet 12 on the penultimate ammunition item has made it possible to correctly reposition the belt 5.

Note that the repositioning of the belt can be obtained in other ways, the main thing being that the cover closing movement can induce a movement of readjustment of the belt parallel to the slip thereof.

Such an alternative example is represented for a horizontal feed channel 100 in FIGS. 18 to 21. In this example, the belt 5 slides on a horizontal surface 102 and is correctly positioned by non-return ratchets 101 actuated by the closing of the cover 107. To this end, the non-return ratchets 101 are fixed onto a slide block 103 comprising an inclined surface 105 cooperating with a corresponding inclined surface 106 on the cover 107.

In all the cases upon the movement of the belt induced by the belt advancing mechanism, the non-return ratchets 101, 12 can be set aside to allow the successive ammunition items 18 to pass in the normal direction of feed.

The lateral positioning of the feed of FIGS. 2 to 12, and the direction of opening of the cover 2 and of the feed channel on a vertical axis also makes it possible to free the top face of the frame, and allows a fixed rail 21 to be fixed onto an essentially tubular frame body 22.

The 45° inclination of the slip plane 3 of the feed channel offers the advantage, already cited, of allowing, in combination with the vertical axis of rotation 4 of the cover, the adjustment of the ammunition item in position. Moreover, this inclination makes it possible to facilitate the positioning of the belt, by hooking the belt onto the advancing ratchets 14, 15, 16 either by holding the weapon vertical (which is not possible for the weapons with vertical feed channel), or by inclining the weapon by only 45° to place the channel horizontal. Other angles of inclination are of course possible, in as much as the lateral bulk is sufficiently limited, and the horizontal component of the slip plane 3 is sufficient for it to be possible to place the belt stably on the advancing ratchets 14, 15, 16 without inclining the weapon. Reasonable angles of inclination lie between 20 and 70°, preferably between 30 and 60'.

FIGS. 5 to 8 illustrate the operation of the feed system of the example of the invention. In this example, the machine gun operates according to a so-called "open breech" cycle, in other words a device in which, except when firing, the bolt 17 and the mobile parts are in rear position, chamber open and empty. The complete firing cycle is then as follows: the triggering of the trigger releases the mobile parts and the bolt 17, which introduces into the passage, via its snug 20, an ammunition item 18 into the chamber. At the end of the forward movement, the bolt is locked on the lock ring, at the rear of the chamber of the barrel. This forward movement is induced by a recoil spring that is compressed in the backward return movement of the mobile parts. The ammunition item is then struck, and a recovery of gas in the last section of the barrel makes it possible to return the mobile parts backward by compressing the recoil spring.

After the last ammunition item has been fired, the trigger generally being kept pressed, the mobile parts perform a last forward movement, and the weapon is returned to the breech closed and chamber empty condition. Depending on whether the user reloads the mechanism before or after placing the ammunition belt, the mobile parts are therefore in front or rear position.

FIG. 5 shows the weapon in standby position, mobile parts toward the rear, an ammunition item in position, the snug 20 of the bolt 17 placed behind the ammunition item that is in position. The belt advancing ratchets 14, 15, 16 are in low position behind the penultimate ammunition item, the belt rests on the non-return ratchet 12 and the holding flaps 11 bear on the links and hold the ammunition item in position in the middle of the opening of the feed channel, ready to be fed by the bolt 17. An ejection claw 13 pushes on the anterior lateral parts 9 of the penultimate link.

When the firing is triggered, the last ammunition item is driven into the chamber by the snug 20 of the bolt 17. Upon this movement, as soon as the ammunition item is entirely detached from the link, the advancing ratchets 14, 15, 16 begin to advance.

Figure 6:
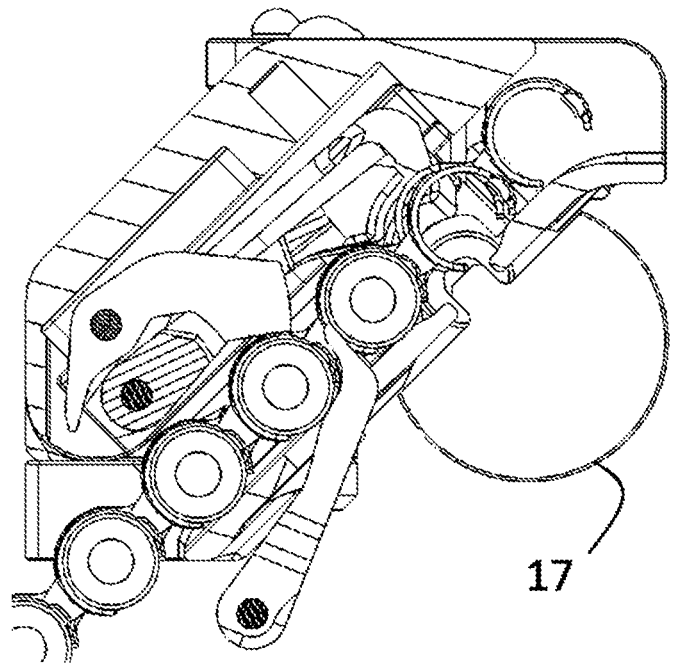
FIGS. 6 to 8 represent cross-sectional views of the device of FIG. 4 during a cycle of firing and of reloading a machine gun of the invention.
Figure 7:
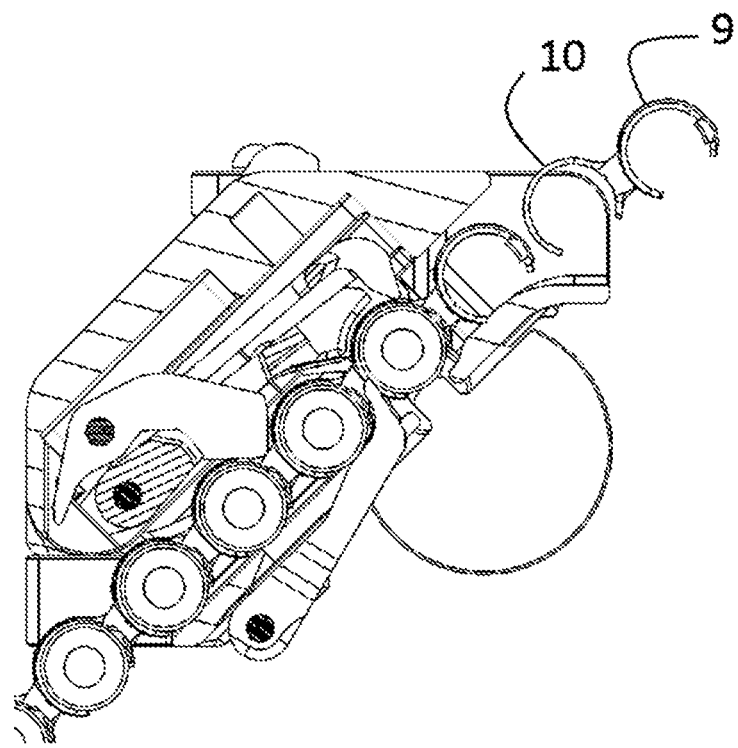
Figure 8:
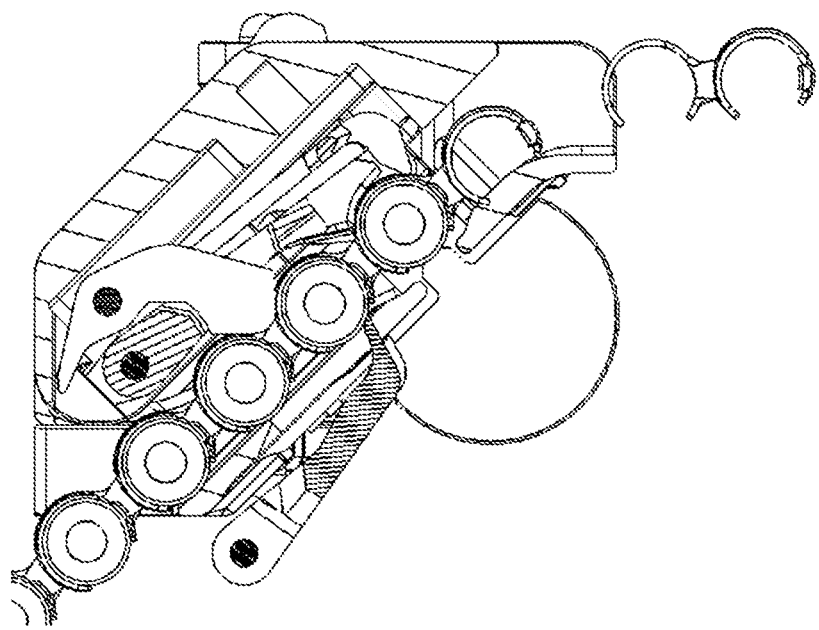

Then, as represented in FIG. 6, upon the forward movement of the mobile parts, the advancing ratchets 14, 15, 16 push the belt 5 to the new in-position position. In FIG. 7, the last link is ejected by the movement of the belt, pushed by the link and the next ammunition item. The ejection claw 13 has pushed in passing on the lateral parts 9 of the penultimate link, but, this penultimate link being linked to the penultimate ammunition item, it is not ejected. As will in fact be seen later, this ejection claw in fact comes into action only upon the ejection of the last two links of a belt. FIG. 8 shows the return movement of the advancing ratchets 14, 15, 16 upon the recoil movement of the mobile parts. During this movement, the belt 5 is retained in position by the non-return ratchet 12. At the end of cycle, the situation of FIG. 5 is restored.

Figure 9:
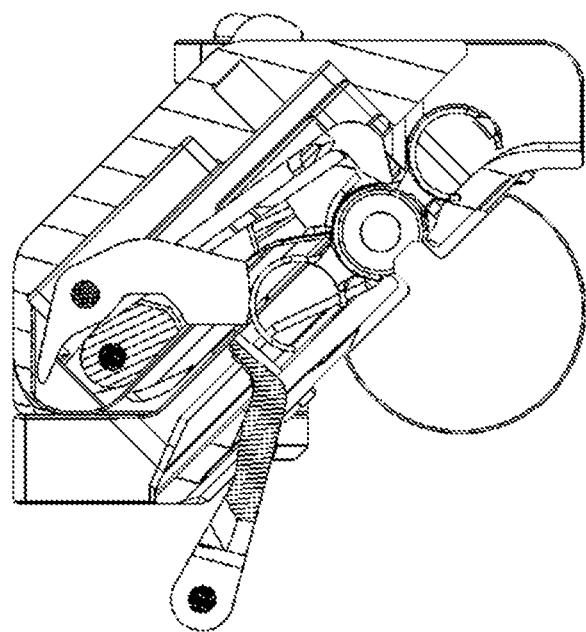
FIGS. 9 to 12 represent cross-sectional views of the device of FIG. 4 during the cycle of firing the last cartridge of an ammunition belt of a machine gun of the invention.
Figure 10:
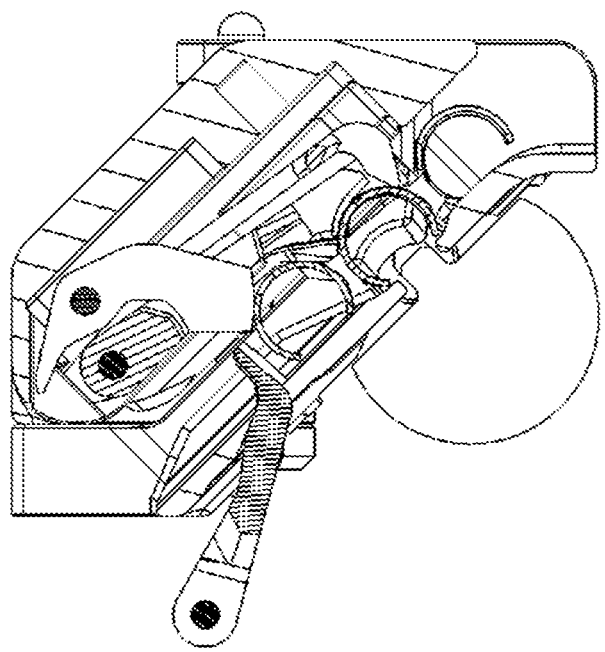

FIGS. 9 to 12 illustrate the ejection of the last two links, upon the firing of the last ammunition item. In FIG. 9, at the start of cycle, the last ammunition item is in position and the central part 10 of the last link rests on the non-return ratchet 12. Note that, at this stage, the lateral advancing ratchets 15 and 16 no longer rest on an ammunition item and can no longer push on the rest of the belt. Only the central ratchet 14 is still facing the central part 10 of the penultimate link, which, at the start of the cycle, rests on the non-return ratchet 12. In FIG. 10, the ammunition item is loaded in the chamber.

Figure 11:
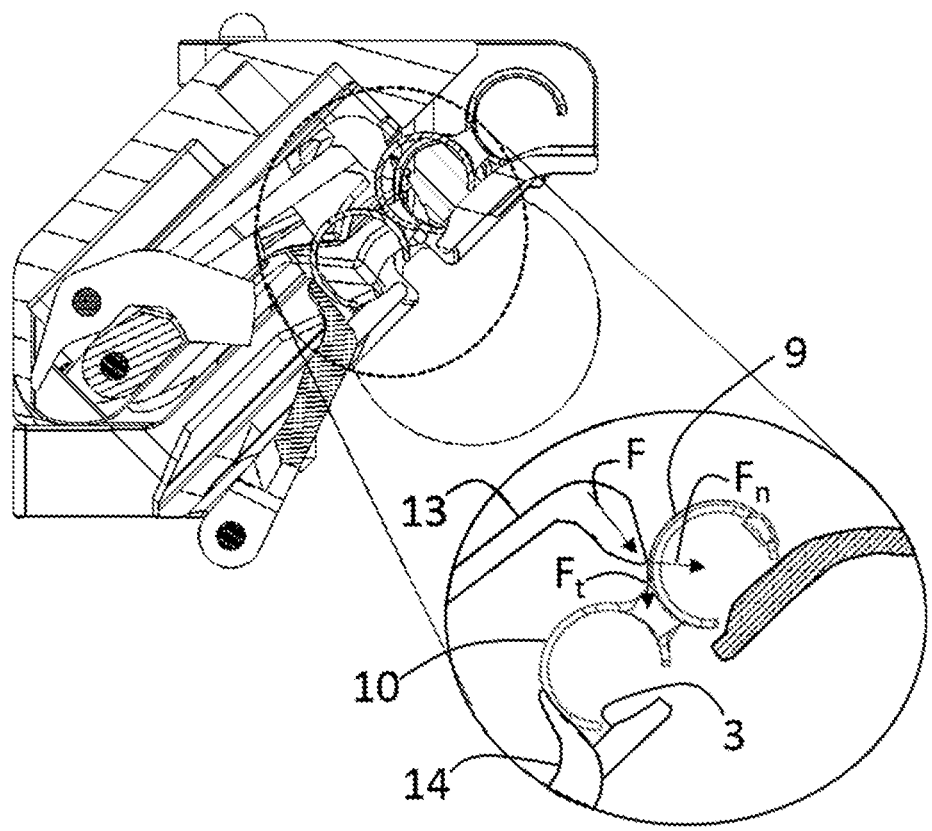
Figure 12:
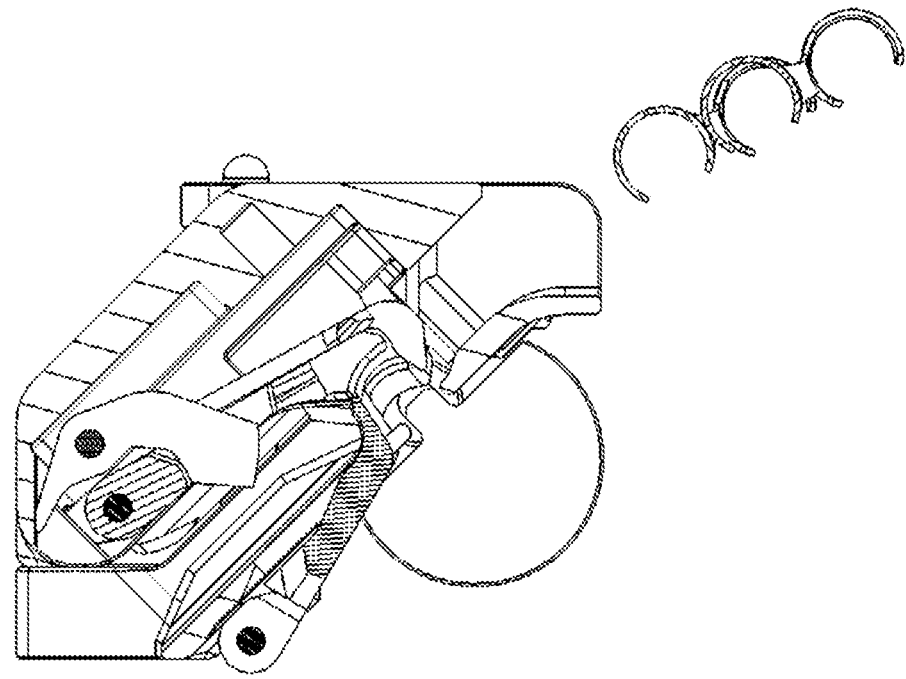

Then, the central ratchet 14 pushes the penultimate link to the position of FIG. 11. In this figure, an enlargement has been represented as an insert in which only the penultimate link, the link ejector 13 and the slip surfaces 3 have been represented. This insert shows the force F applied by the ejector 13 on the anterior lateral parts 9 of the penultimate link. This force is broken down into a force normal to the surface of the link F and a tangential force Ft. Beyond a certain position, the tangential force $F_t$ exceeds the static friction threshold, while the normal force $F_n$ is practically parallel to the slip plane 3. At this moment, the link is abruptly ejected, and also pushes the link in front of it.

Finally, when the last link is ejected, the claw 13 no longer rests on an ammunition item, and, because of this, occupies an extreme position that it never occupies during of a cycle in the presence of an ammunition belt. This movement to an extreme position can be exploited to displace a belt indicator giving an indication as to the absence of belt.

Figure 13:
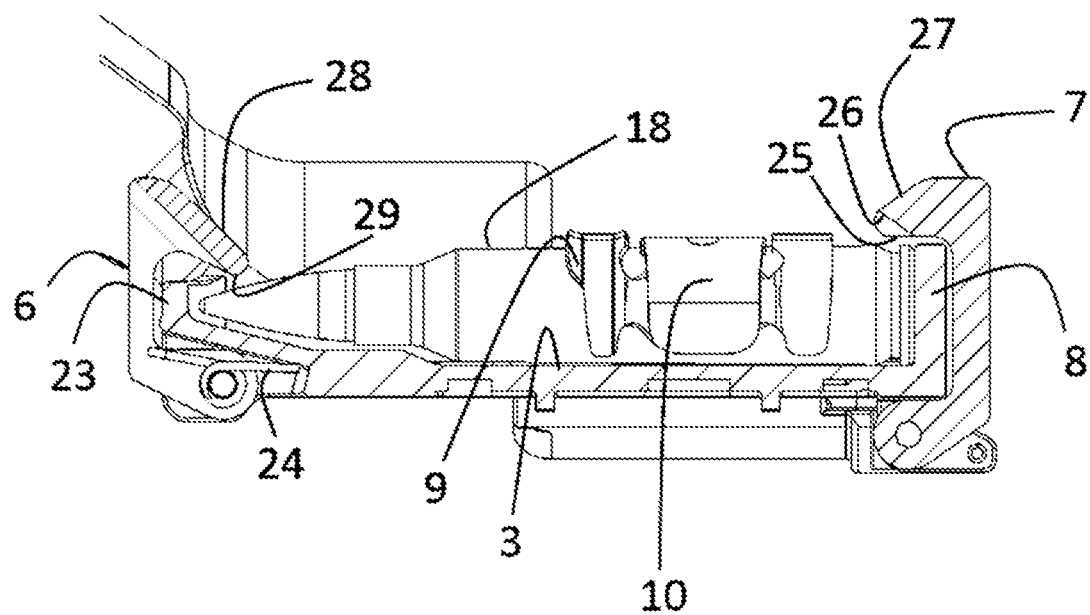
FIG. 13 represents an edgewise view of a feed channel comprising belt holding means according to the invention.

FIG. 2 shows holding runners 6, 7 cladding the top edge of the lateral faces 8, 23 of the feed channel. FIG. 13 shows a cross section of the feed channel, with an ammunition item in position. In this figure, an anterior runner 6 and a posterior runner 7 are distinguished retaining the ammunition item 18 in the feed channel via surfaces 25, 29 facing the slip surface 3 of the belt.

These runners 6, 7 are held in holding position by springs 24. These springs make it possible to introduce the belt by separating the two runners. This separation is advantageously obtained by virtue of inclined surfaces 27, 28 on the top face of the runners, the separation being then obtained by simply pushing the belt against the runners. Note that it would be sufficient for a single runner to be mobile to introduce the belt. In the latter case, nevertheless, the handling would be less flexible (requirement to introduce according to a predefined direction).

Alternatively, the retractable runners 6, 7 could be replaced by holding surfaces facing the slip surface 3 that are directly fixed to (even form part of) the lateral faces 23, 8 of the feed channel, either these surfaces, or the walls of the feed channel being sufficiently flexible to allow the placement "by force" of the belt.

The advantage of these holding means is that they make it possible to place the belt, or to open the cover 2 of the feed channel independently of the orientation of the weapon without the belt falling from the channel.

The presence of a chamfer 26 at the edge of the posterior runner 7 will be noted in FIG. 13. This chamfer is present only facing the last ammunition item and makes it possible to remove the belt by a twisting movement, or a raising movement of the posterior part of the ammunition item corresponding to the entry of the belt into the feed channel, which pushes the posterior runner 7 backward, by virtue of the chamfer.

FIGS. 14 to 17 show different separate elements in perspective, so as to clarify the parts possibly hidden in the preceding figures.

Figure 14:
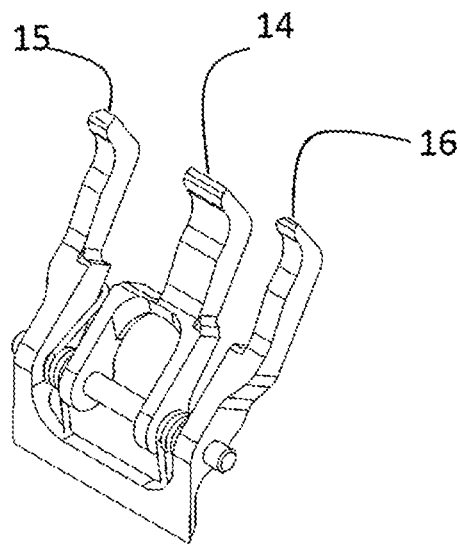
FIG. 14 represents a claw for advancing the belt and for ejecting the last link according to an example of the invention.

FIG. 14 shows a belt drive claw. This claw has three ratchets 14, 15, 16. The two lateral ratchets bear directly on the penultimate ammunition item, respectively before or after the anterior lateral parts 9 of the antepenultimate link. The ratchet 14, for its part, pushes on the central part 10 of the penultimate link.

These three ratchets 14, 15, 16 can be secured, or, preferably, the central ratchet 14 is elastically linked to the other two ratchets, for example via a torsion spring. Indeed, there is a space between the ammunition items which allows a greater movement amplitude for the lateral ratchets 15, 16 than for the central ratchet, which is blocked by the surface linking the successive links. Because of this, the bearing offered by the central ratchet 14 provides a less reliable bearing, and potentially prevents the lateral ratchets from assuming an optimal position. Separating the central ratchet 14 then allows an optimal movement amplitude for the lateral ratchets 15, 16.

Note that, upon the ejection of the last link, the central ratchet 14 is no longer blocked by the surface linking the successive links and it can then take a more reliable bearing surface. At that moment, also, as mentioned above, the lateral ratchets 15, 16 no longer rest on an ammunition item, and therefore no longer participate in the displacement of the belt.

Figure 15:
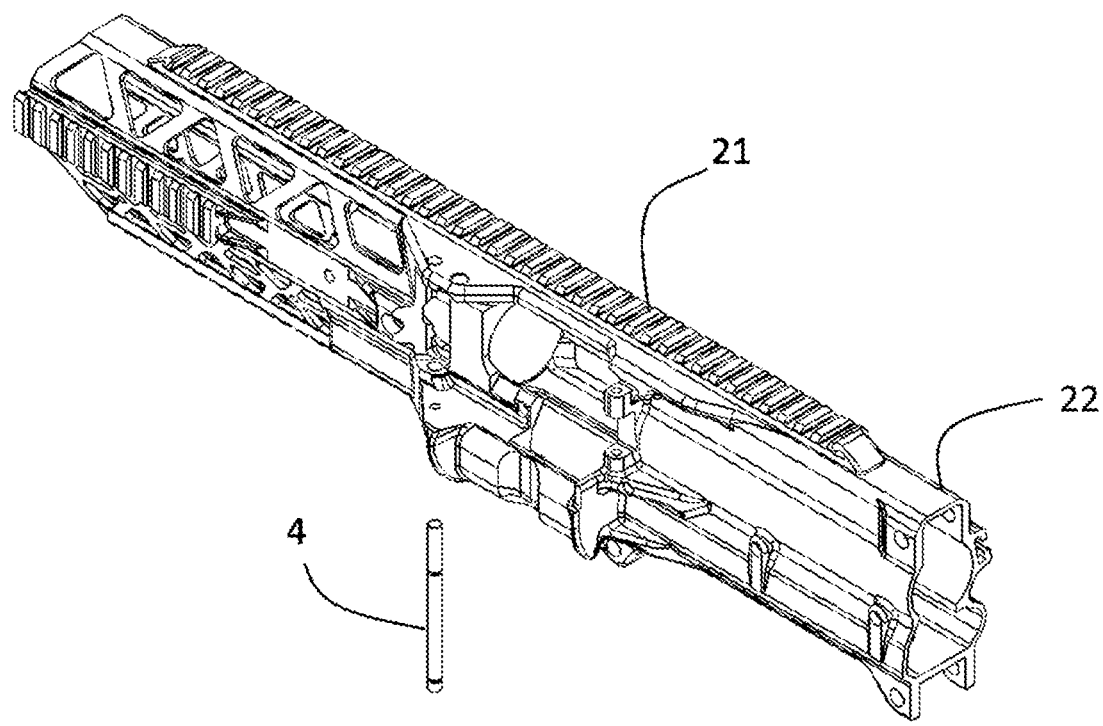
FIG. 15 represents an example of machine gun frame according to the invention.

FIG. 15 shows a tubular frame body 22. This closed geometry makes it possible to obtain a better rigidity, and in particular a better twist resistance than the open profiles. As can be seen in this figure, the lateral position of the feed channel allows for the fixing of a fixed Picatinny rail 21. Furthermore, the positioning of the belt advancing mechanism on the frame side rather than in the cover allows for a lateral opening of short length, which further improves the mechanical properties of the assembly.

Figure 16:
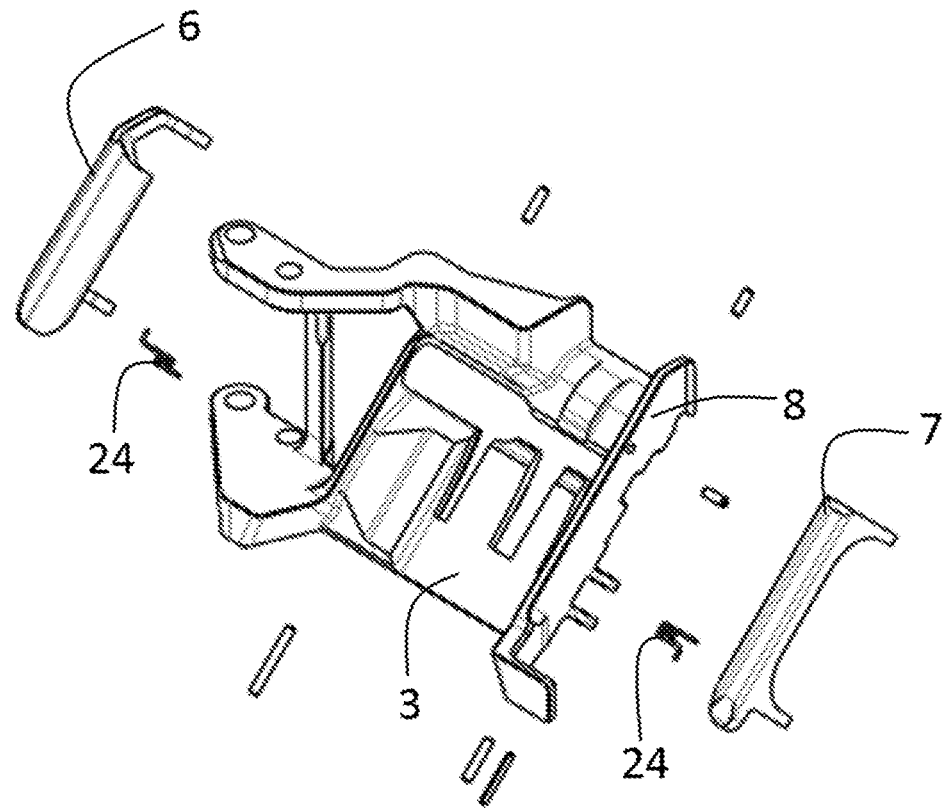
FIG. 16 represents an exploded view of a feed channel according to the invention.
Figure 17:
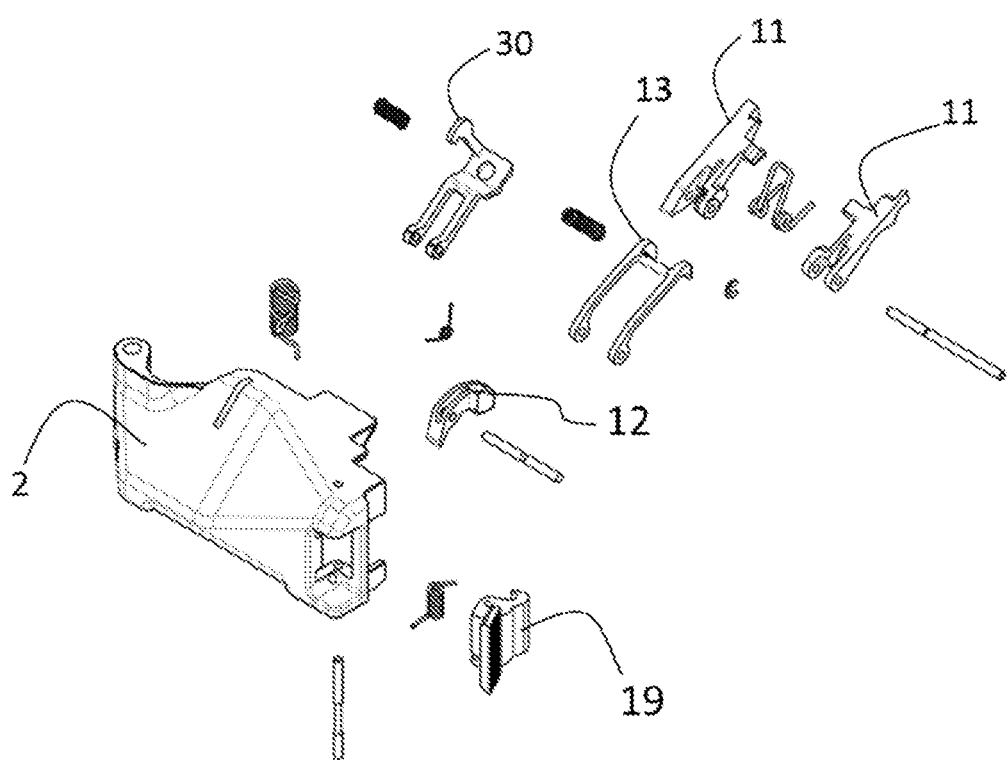
FIG. 17 represents an exploded view of a feed channel cover according to the invention.
Figure 18:
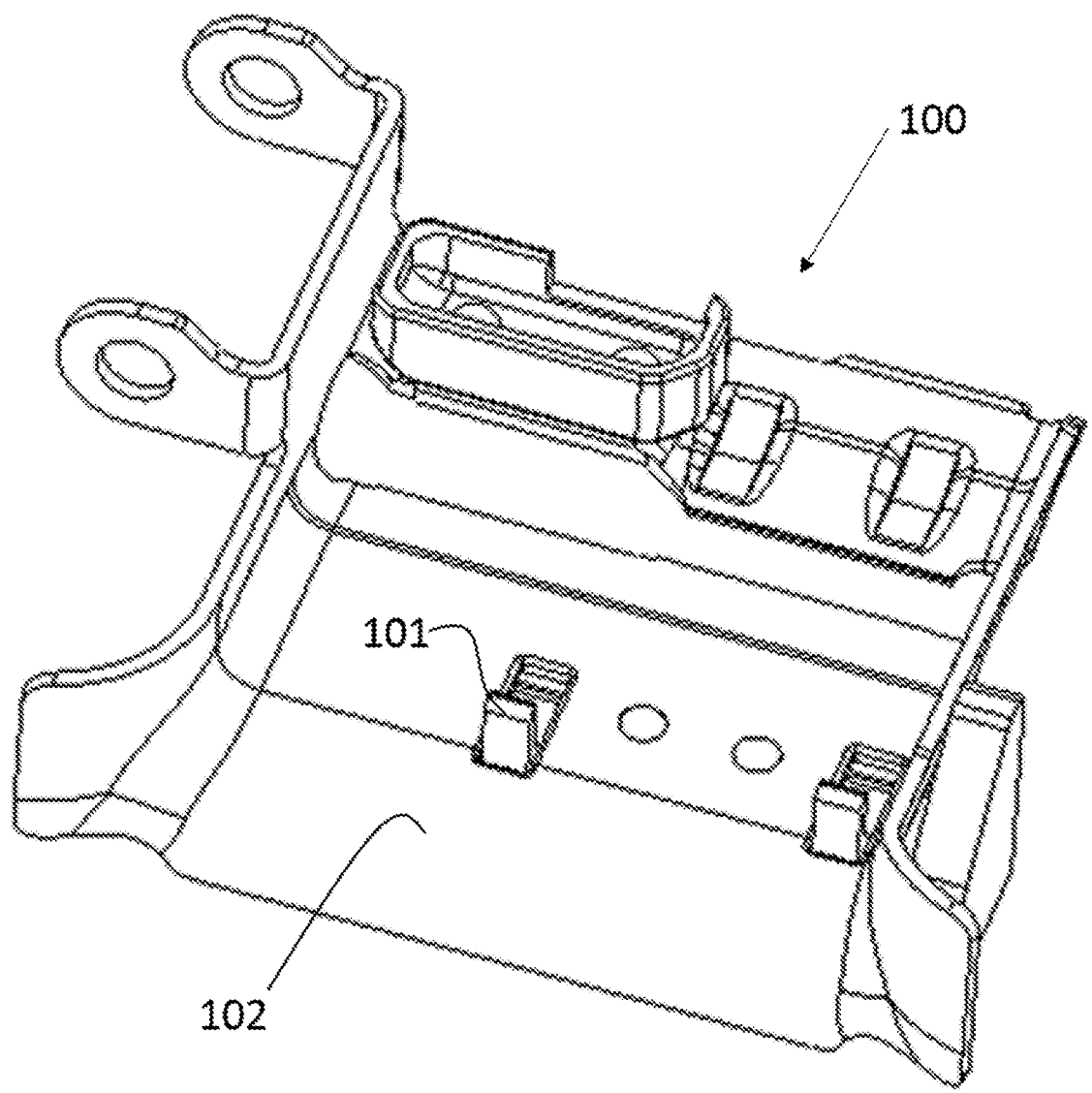
FIG. 18 represents a perspective view of another example of feed channel comprising belt repositioning means.
Figure 19:
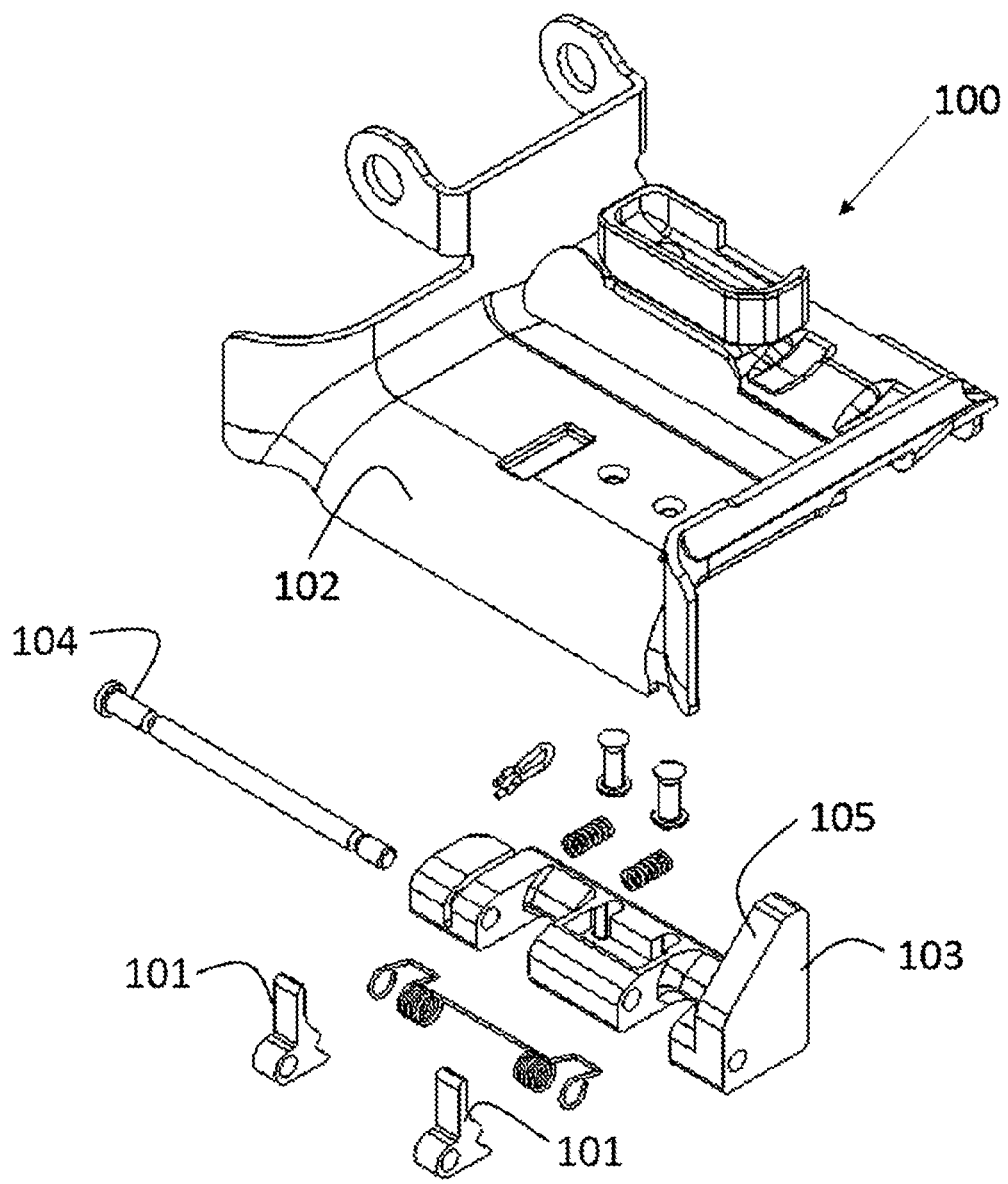
FIG. 19 represents an exploded view of the channel of FIG. 18.
Figure 20:
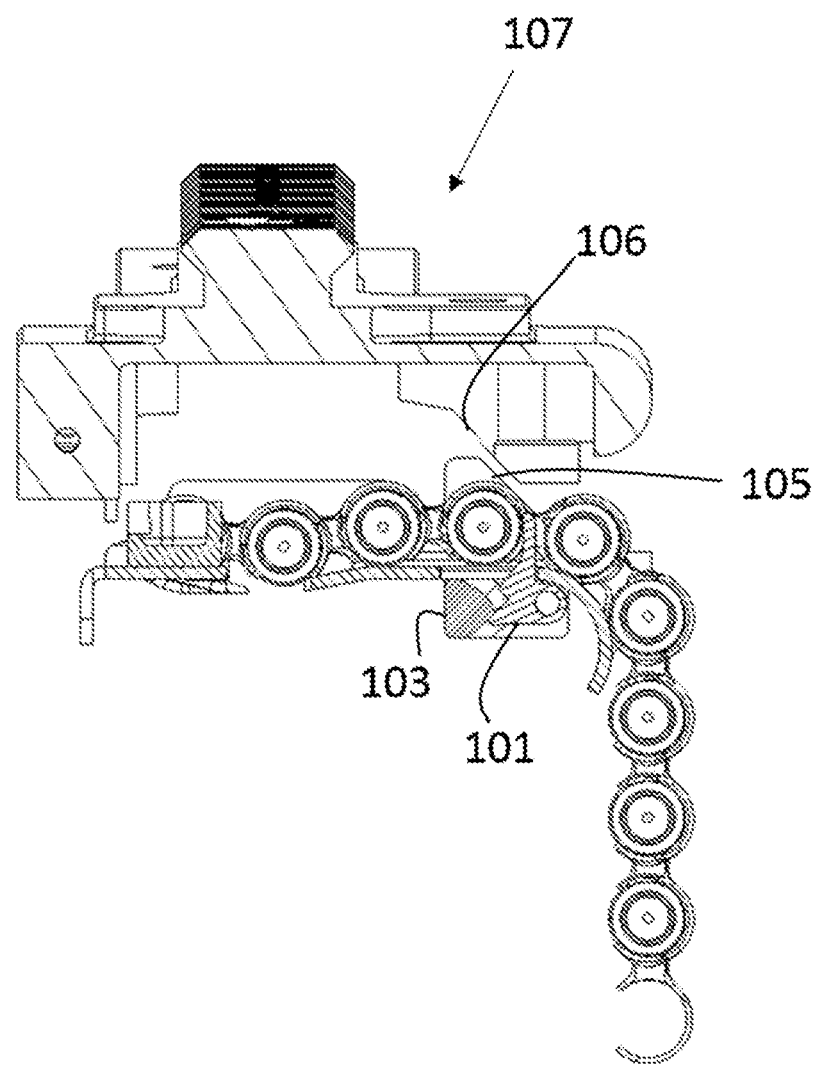
FIGS. 20 and 21 represent cross-sectional views of the device comprising the channel of FIGS. 18 and 19, showing the movement induced by the closing of the cover.
Figure 21:
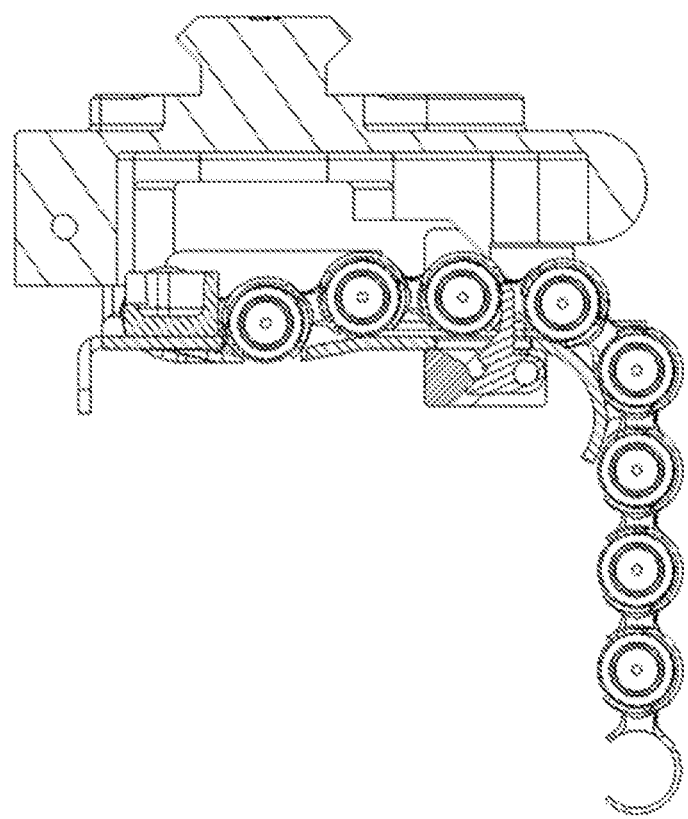

FIG. 16 shows an exploded view of the feed channel. The two holding springs 24 for the runners 6, 7 are distinguished therein.

The invention claimed is:

1. A machine gun, comprising:
   a frame body having an essentially tubular geometry;
   a cover disposed laterally with respect to the frame body, the cover having an axis of rotation perpendicular to a longitudinal axis of the tubular geometry, the cover configured to rotate away from a lateral side of the frame body; and
   a feed channel disposed laterally with respect to the frame body and inclined relative to the axis of rotation of the cover, the feed channel configured to feed an ammunition belt;
   a top face of the frame body comprising a fixed accessory assembly interface, said fixed assembly interface extending on an entire length of the frame body.

2. The machine gun as claimed in claim 1, wherein the feed channel is inclined according to an angle of between 20° and 70° relative to the axis of rotation of the cover.

3. The machine gun as claimed in claim 1, wherein the fixed assembly interface comprises a rail of Picatinny type.

4. The machine gun as claimed in claim 1, wherein said cover comprises a component that during closure is parallel to said feed channel.

5. The machine gun as claimed in claim 1, wherein said feed channel comprises ratchets for holding the ammunition belt when the cover is open.

6. The machine gun as claimed in claim 1, wherein the cover of the feed channel comprises an ejection claw for ejecting links of the ammunition belt.

7. The machine gun as claimed in claim 1, wherein the cover of the feed channel comprises holding runners for holding links of the ammunition belt.

8. The machine gun as claimed in claim 1, comprising belt advancing ratchets for advancing the ammunition belt bearing in use on a link.

9. The machine gun as claimed in claim 1, wherein the frame body comprises a material having a density less than 6 kg/l.

10. The machine gun as claimed in claim 1, wherein the frame body is produced by a casting method.

11. The machine gun as claimed in claim 10, wherein a finishing of the frame body is performed by spark machining after casting.

12. The machine gun as claimed in claim 1, wherein the frame body is produced by an additive manufacturing method.

13. The machine gun as claimed in claim 1, wherein the frame body comprises aluminum or titanium.

* * * * *